Patented Mar. 30, 1937

2,075,765

UNITED STATES PATENT OFFICE 2,075,765

LIQUID XYLYLHEPTADECYL KETONES AND PROCESS OF PREPARING THE SAME

Anderson W. Ralston and Carl W. Christensen, Chicago, Ill., assignors to Armour and Company, Chicago, Ill., a corporation of Illinois No Drawing. Application October 8, 1936, Serial No. 104,703

6 Claims. (Cl. 260—131)

This invention relates to liquid mixtures of xylylheptadecyl ketones and processes of preparing the same, and it comprises, as new materials, a liquid mixture of isomeric xylylheptadecyl ketones; and it further comprises processes wherein commercial xylene containing an isomeric mixture of ortho, meta, and para xylenes, is reacted with stearyl chloride by a Friedel-Crafts synthesis.

In previous patents we have described many ketones obtained by reacting aromatic compounds with higher fatty acid chlorides by the Friedel-Crafts reaction. Most of the aralkyl ketones thus obtained have been solid, wax-like materials. These ketones are substances of high chemical stability and uses for them are many. They can, for example, be added to lubricating oils to impart desirable properties thereto. They can be used as dielectric materials, as waxing and polishing compositions, and in a number of other relations. Many of these uses take advantage of the fact that most of these ketones are normally solid materials. Thus, for instance, a furniture wax should have waxy, film forming constituents which are normally solid.

But in other relations it is desirable that the ketones be normally liquid. The ketonic materials are good lubricants. They are desirable constituents in paints, lacquers, and other coating compositions in which they act as plasticizers. Because most of the mixed aralkyl ketones are solids carrier fluids or solvents are used to incorporate them in paints; and, when used as lubricants, it is best to admix them with other lubricants which are normally liquid.

Uses for these aralkyl ketones of relatively high molecular weight would be greatly expanded if normally liquid ketones could be made. Thus, for example, such a ketone could be used as a lubricant for fine mechanisms provided its viscosity and other physical characteristics were satisfactory. And the liquid ketones could be incorporated readily in many different kinds of liquid compositions such as paints, lacquers and the like. They could even be used as solvents or carrier vehicles for various materials such as insecticides used in spraying trees.

A cheap source of the aralkyl ketones presupposes that they shall be made from the abundant fats and fatty acids of relatively high molecular weight, such as those obtained around a slaughter house. To put it another way, the alkyl radical or group of the aralkyl ketone R—CO—R', where R' is the alkyl group, should be derived from a higher fatty acid. Of the higher fatty acids available from the source stated, stearic acid is one of the most abundant and stearyl chloride can be made therefrom at little expense by the use of various well-known chlorinating agents. Stearyl chloride, $C_{17}H_{35}COCl$, reacts readily with aromatic hydrocarbons such as benzene in the Friedel-Crafts synthesis. Consequently, we have set ourselves to the problem of making aralkyl ketonic materials which are normally liquid and which have, as one constituent radical or group the $C_{17}H_{35}$ group, commonly referred to as heptadecyl. And we have discovered that when commercial xylene is reacted with stearyl chloride the resulting product is a liquid oil of low viscosity, low solidification point, and high flash and fire points. These characteristics suit the product for the many uses to which liquid, high molecular weight aralkyl ketones can be put.

Pure xylylheptadecyl ketones are old in the art. For example, p-xylylheptadecyl ketone has been described and its melting point is 57° C. Hence it is normally solid. The meta compound is also solid, its melting point being 39° C. That such pure chemical individuals would be expected to be solids is predictable from the fact that phenylheptadecyl ketone is also normally solid with a melting point of 59° C.

Yet when we start with commercial xylene containing o-, m-, and p-xylene we have discovered that the reaction product is a liquid whose solidification point is close to 0° C. This result is surprising and could not be predicted from the melting points of pure xylylheptadecyl ketones. One way of accounting for the formation of a liquid rather than a solid reaction product may depend upon the fact that a mixture of o-, m-, and p-xylylheptadecyl ketones is formed and that this mixture, for some reason, is liquid although its constituents are solid. But we do not attribute the physical state of the ketone mixture wholly to isomerism. We believe that methyl groups may possibly migrate during the course of the reaction. What actually happens cannot, of course, be stated with any certainty. We can only note the fact that when commercial xylene containing the three isomeric xylenes stated is reacted with stearyl chloride the reaction product is a liquid rather than the expected solid.

We shall now describe methods of making our liquid xylylheptadecyl ketone mixture, it being understood, of course, that the specific disclosure is only illustrative, and variations in it are within the knowledge of those skilled in the art.

Five hundred and twenty seven parts by weight of commercial xylene and about 580 parts by weight of stearyl chloride are charged into a suitable reaction vessel provided with a reflux condenser, agitator, and heating coils. To this charge we slowly add about 320 parts by weight of aluminum chloride over a period of about 90 minutes with agitation. The initial reaction is quite vigorous and the aluminum chloride should be added slowly so that the temperature does not rise very much above about 25° C. After all the catalyst has been added the reaction mixture is heated for about 3 hours at a temperature of 60° C. to 65° C. The mixture is then allowed to cool and poured onto a mixture of cracked ice and hydrochloric acid. This hydrolyzes the complex aluminum chloride reaction product. Then the mixture of hydrochloric acid and reaction product is steam-distilled to drive off any unreacted xylene. The reaction product, which is oily, floats on the surface of the acid mixture and can be decanted therefrom. After separation in this manner the reaction product is washed with water until free of acid, and dried.

The physical properties of the reaction product are as follows:

| | |
|---|---|
| Boiling point range | 200–280° C./3 mm. |
| Solidification point | 0° C. |
| Flash point | 446° F. |
| Fire point | 502° F. |
| Viscosity Saybolt | 85 seconds at 100° F. |
| | 40 seconds at 210° F. |
| Specific gravity | 0.901 |
| Refractive index | 1.4930 at 20° C. |

Modifications in the above procedure can be made. The ratio of stearyl chloride to commercial xylene can be varied somewhat from that given and of course the reaction time will depend largely on the capacity of the apparatus. The time period for adding the aluminum chloride will vary with the quantities of reactants. During the addition of the aluminum chloride the temperature should not be allowed to rise above about 25° C. and this factor governs the speed at which the chloride can be added.

The reaction product is most probably a mixture of ketones having the generic structure R—CO—R' wherein R' is heptadecyl and R a xylyl radical. Some proportion of the ketone mixture may have a p-xylyl radical, another may have an m-xylyl radical, and another may have an o-xylyl radical.

Having thus described our invention, what we claim is:

1. A normally liquid mixture of xylylheptadecyl ketones.

2. A normally liquid mixture of xylylheptadecyl ketones having a solidification point of about 0° C.

3. A normally liquid mixture of xylylheptadecyl ketones having the following properties:

| | |
|---|---|
| Boiling point range | 200–280° C./3 mm. |
| Solidification point | 0° C. |
| Flash point | 446° F. |
| Fire point | 502° F. |
| Viscosity Saybolt | 85 seconds at 100° F. |
| | 40 seconds at 210° F. |
| Specific gravity | 0.901 |
| Refractive index | 1.4930 at 20° C. |

4. A normally liquid mixture of xylylheptadecyl ketones being the product of reacting a mixture of xylene isomers with stearyl chloride by a Friedel-Crafts synthesis.

5. The process which comprises reacting a mixture of xylene isomers with stearyl chloride in the presence of aluminum chloride and hydrolyzing the reaction mixture to obtain a liquid mixture of xylylheptadecyl ketones.

6. The process which comprises reacting a mixture of xylene isomers and stearyl chloride in the ratios of about 527 parts by weight to 580 parts by weight, respectively, in the presence of about 320 parts by weight of aluminum chloride, and then hydrolyzing the reaction mixture to obtain an oily, liquid mixture of aralkyl ketones in which the aryl group thereof is derived from the xylene and the alkyl group is heptadecyl.

ANDERSON W. RALSTON.
CARL W. CHRISTENSEN.